(12) United States Patent
Kamizono et al.

(10) Patent No.: US 7,154,262 B2
(45) Date of Patent: Dec. 26, 2006

(54) ROTATION ANGLE DETECTING DEVICE

(75) Inventors: Tsutomu Kamizono, Nagoya (JP); Koji Wato, Obu (JP); Masahiro Taguchi, Hazu-gun (JP); Shinji Ando, Nakata-gun (JP); Shigetoshi Fukaya, Toyota (JP); Kenji Takeda, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/044,228

(22) Filed: Jan. 28, 2005

(65) Prior Publication Data
US 2005/0162157 A1    Jul. 28, 2005

(30) Foreign Application Priority Data
Jan. 28, 2004 (JP) ............................. 2004-020544
Feb. 18, 2004 (JP) ............................. 2004-041870

(51) Int. Cl.
*G01B 7/30* (2006.01)

(52) U.S. Cl. .................................. 324/207.25; 324/252

(58) Field of Classification Search ........... 324/207.25, 324/252
See application file for complete search history.

(56) References Cited

U.S. PATENT DOCUMENTS

| 5,228,139 A | 7/1993 | Miwa et al. |
| 5,523,679 A * | 6/1996 | Kalb .......................... 324/165 |
| 5,789,917 A | 8/1998 | Oudet et al. |
| 6,043,645 A | 3/2000 | Oudet et al. |
| 6,275,027 B1 * | 8/2001 | Kogure et al. ........... 324/207.2 |
| 2004/0164733 A1 | 8/2004 | Fukaya et al. |

* cited by examiner

*Primary Examiner*—Reena Aurora
(74) *Attorney, Agent, or Firm*—Posz Law Group, PLC

(57) ABSTRACT

A rotation angle detecting device includes a columnar permanent magnet that has a generally ring-shaped cross-section and a pair of magnetic poles, a pair of semi-cylindrical yokes disposed in a circumferential direction opposite the permanent magnet, a rotary shaft fixed to the permanent magnet at a shifted rotation axis and a magnetic sensor disposed in one of circumferential gaps between the yokes. The rotation axis and the magnetic poles are arranged so that the magnetic flux density becomes maximum at portions of the yoke less than 90 degrees angled from the circumferential gap in which the magnetic sensor is disposed.

3 Claims, 12 Drawing Sheets

ROTATION ANGLE DETECTING DEVICE

CROSS REFERENCE TO RELATED APPLICATION

The present application is based on and claims priority from Japanese Patent Applications 2004-20544, filed Jan. 28, 2004 and 2004-41870, filed Feb. 18, 2004, the contents of which are incorporated herein by reference.

BACKGROUND OF THE INVENTION

1. Field of the Invention

The present invention relates to a rotation angle detecting device that detects a rotation angle of a rotary object.

2. Description of the Related Art

JP-B2-2842482 or either one of its counterpart U.S. Pat. Nos. 5,228,139, 5,789,917 and 6,043,645 discloses, as shown in FIG. 12, a rotation angle detecting device 100 that includes a cylindrical permanent magnet 101 to be fixed to a rotary object, a cylindrical yoke 102 and a hall element 103 disposed in one of circumferential gaps 102a, 102b. The cylindrical permanent magnet 101 is coaxially disposed within the cylindrical yoke 102 to provide a magnetic flux that changes as a rotary object rotates, and the hall element 103 provides a voltage signal that corresponds to flux density of the magnetic flux.

However, such a rotation angle detecting device can not detect an accurate rotation angle of a rotary object because such an coaxially disposed cylindrical permanent magnet can not provide a magnetic flux curve that does not have a flat portion with respect to the rotation angle, as shown in FIG. 13.

SUMMARY OF THE INVENTION

It is an object of the invention to provide a rotation angle detecting device that can provide an optimum magnetic flux curve for a sensor to accurately detect magnetic flux density, even if the rotary object widely turns.

Another object is to provide a rotation angle detecting device that can reduce a variation due to a hysteresis of magnetic flux in a magnetic circuit of the device by changing magnetic circuit of the rotation angle detecting device so that portions of the yoke where the magnetic flux density becomes maximum (e.g. $M_{max}$ as shown in FIG. 12) can be shifted toward the hall element 103.

Another object of the invention is to provide an inexpensive rotation angle detecting device that can accurately detect the rotation angle of a rotary object without using an expensive material such as permalloy.

According to a feature of the invention, a rotation angle detecting device includes a columnar member for providing magnetic flux that has a generally oval cross-section and a front surface having one magnetic pole and a rear surface having the other magnetic pole, a yoke that is disposed radially outer side of the columnar member and has a generally cylindrical inner surface and a circumferential front gap disposed opposite the front surface of the columnar member, a rotary shaft fixed to the columnar member so that the columnar member can turn back and forth within the inside surface of the yoke, and a magnetic sensor disposed in the front gap to detect the magnetic flux density of the yoke. With the above structure, the shape of the cross-section and the rotation axis are arranged so that the magnetic flux density becomes maximum at portions of the yoke within 90 degrees (or more than 270 degrees) from the front gap. The yoke may have portions adjacent to said front gap that are thicker than other portions.

According to another feature of the invention, a rotation angle detecting device includes a columnar permanent magnet having a generally oval cross-section that has a long axis and a short axis intersecting right angles at the middle position of the long axis, a front surface magnetized to have one magnetic pole at a front end of the short axis and a rear surface magnetized to have the other magnetic pole at a rear end of the short axis, a yoke that is disposed radially outer side of the permanent magnet and has a generally cylindrical inner surface and a circumferential front gap disposed opposite the front surface of the permanent magnet, a rotary shaft fixed to the permanent magnet at a position of the short axis offset from the middle position so that the permanent magnet can turn back and forth within the inside surface of the yoke, and a magnetic sensor disposed in the front gap to detect the magnetic flux density of the yoke.

In the above rotation angle detecting device, the peripheral line of the front surface of the permanent magnet has a front curve that is expressed as follows: $X^2/b^2+Y^2/a^2=1$, in which a is a distance between the middle point and an intersection of the short axis and the front curve, b is a distance between the middle point and an intersection of the long axis and the front curve. Further, the peripheral line of the rear surface of the permanent magnet has a rear curve whose radius R of curvature is expressed as follows: $R=b+(a'-b)\times(\theta_b/90)^2$, $(0°\leq\theta_b\leq 90°)$, $R=b+(a'-b)\times((180-\theta_b)/90)^2$, $(90°\leq\theta_b\leq 180°)$ in which a' is a distance between the middle point and an intersection of the short axis and the rear curve, $\theta_b$ is an angle of a point on the rear curve angled from the long axis.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A rotation angle detecting device 1 according to the first embodiment of the invention will be described with reference to FIGS. 1A–5.

Figure 1A:
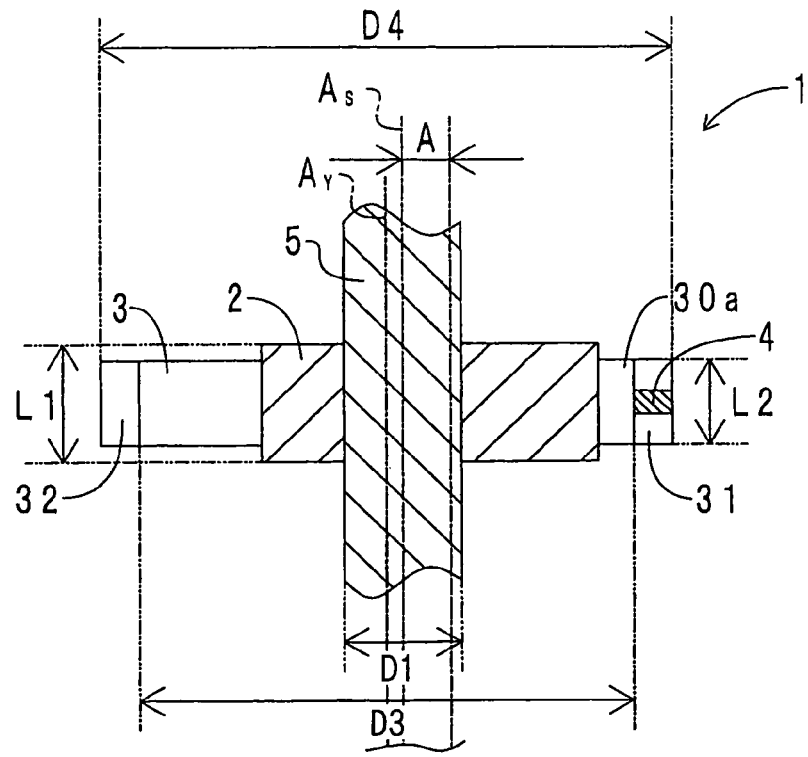
FIGS. 1A and 1B are, respectively, a schematic cross-sectional longitudinal view illustrating a rotation angle detecting device according to the first embodiment of the invention and a plan view thereof.

As shown in FIG. 1A, the rotation angle detecting device 1 according to the first embodiment includes a permanent magnet 2, a ring-shaped magnetic yoke 3, a hall IC element 4 and a rotary shaft 5. The permanent magnet 2 has a generally oval cross-section that has a long axis and a short axis and has front and rear surfaces at the opposite end of the short axis. The front and rear surfaces are not symmetrical with each other and different in peripheral curvature, as described below. The permanent magnet 2 is made of a ferrite magnet material and magnetized to have a magnetic N pole at the front surface and magnetic S pole at the rear surface. The ferrite magnet material may be replaced by a hard magnetic material.

The rotary shaft 5 is made of steel such as SUS 304 and fixed to the permanent magnet 2 at such an eccentric portion of the cross-section thereof as described below. The rotary shaft 5 is linked with an accelerator of an automotive vehicle in such that the rotary shaft 5, together with the permanent magnet 2, turns back and forth according to up-down motion of the accelerator.

The cylindrical yoke 3 is comprised of a pair of semicircular magnetic members 30a, 30b disposed in a cylindrical space with a pair of circumferential gaps 31, 32 in-between. That is, the air gaps are 180 degrees spaced apart from each other. The yoke 3 is made of a soft steel, such as SPC-SD, and fixed to a housing (not shown) at an inside surface thereof. The yoke 3 provides a magnetic circuit for the magnetic flux supplied from the permanent magnet 2.

The hall IC element 4 is disposed in a front gap 31 that is located opposite the front surface of the permanent magnet 2. The hall IC includes a operational amplifier to convert magnetic flux density to voltage.

When an accelerator of a vehicle is operated and the rotary shaft 5 turns, the permanent magnet 2 also turns. Therefore, the magnetic flux density in the air gaps 31, 32 changes. The hall IC element 4 detects the change in magnetic flux density and provides a voltage signal, which has been amplified by the operational amplifier to have a suitable amplitude. Thus, the motion of the accelerator pedal is detected.

The rotation angle detecting device 1 has the following specifications: the rotary shaft 5 has an outside diameter D1 of 4 mm; the permanent magnet 2 has an axial length L1 of 6 mm; the yoke 3 has an inside diameter of 15 mm, an outside diameter D4 of 18 mm, an axial length L2 of 5 mm; and each of the gaps 31, 32 has a circumferential width G of 1.5 mm. As shown in FIG. 1, a distance A between the center axis As of the rotary shaft 5 and a straight boundary line BL that joins two boundary points α, α' formed on the surface of the permanent magnet member 2 between two magnetic poles N, S is 1.0 mm. In other words, the surface of the permanent magnets is divided by the boundary points α, α' into a front and rear surfaces.

Figure 2:
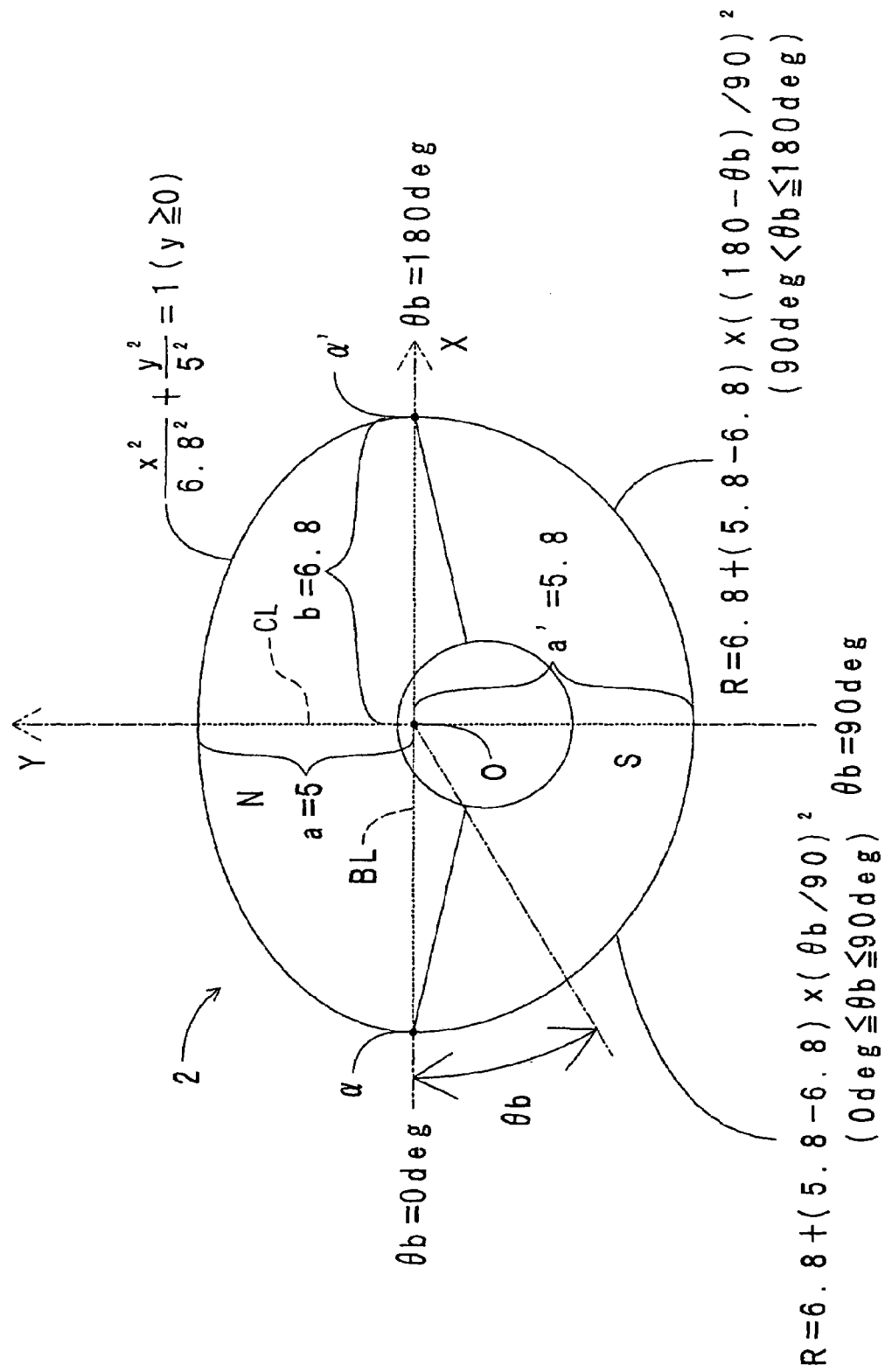
FIG. 2 is a schematic plan view of a permanent magnet of the rotation angle detecting device shown in FIGS. 1A and 1B.

As shown in FIG. 2, a center line CL (which corresponds to the short axis of the oval cross-section) of the permanent magnet member 2 intersects the boundary line BL (which corresponds to the long axis of the oval cross-section) at right angles at the middle point O of the permanent magnet member. The center of the magnetic poles N, which is disposed on the front surface along the center line CL, is located at a distance a of 5 mm from the middle point O, and the center of the magnetic pole S, which is disposed on the rear surface along the center line CL at a distance a' of 5.8 mm from the middle point O. The distance b between the middle point O and each boundary point α or α' is 6.8 mm.

Assuming that the center line CL is X axis and the boundary line BL is Y axis, the upper peripheral line of the permanent magnet member 2 is expressed as follows: $X^2/6.8^2 + Y^2/5^2 = 1$ (Y>0).

On the other hand, the curvature radius R of the lower peripheral line of the permanent magnet member 2 shown in FIG. 2 is expressed as follows, if the angle $\theta_b$ of the boundary point α is assumed 0 deg, and the angle $\theta_b$ of the boundary point α' is assumed 180 deg:

$$R = 6.8 + (5.8-6.8) \times (\theta_b/90)^2 \quad (0° \leq \theta_b \leq 90°)$$

$$R = 6.8 + (5.8-6.8) \times ((180-\theta_b)/90)^2 \quad (90° \leq \theta_b \leq 180°)$$

Figure 1B:
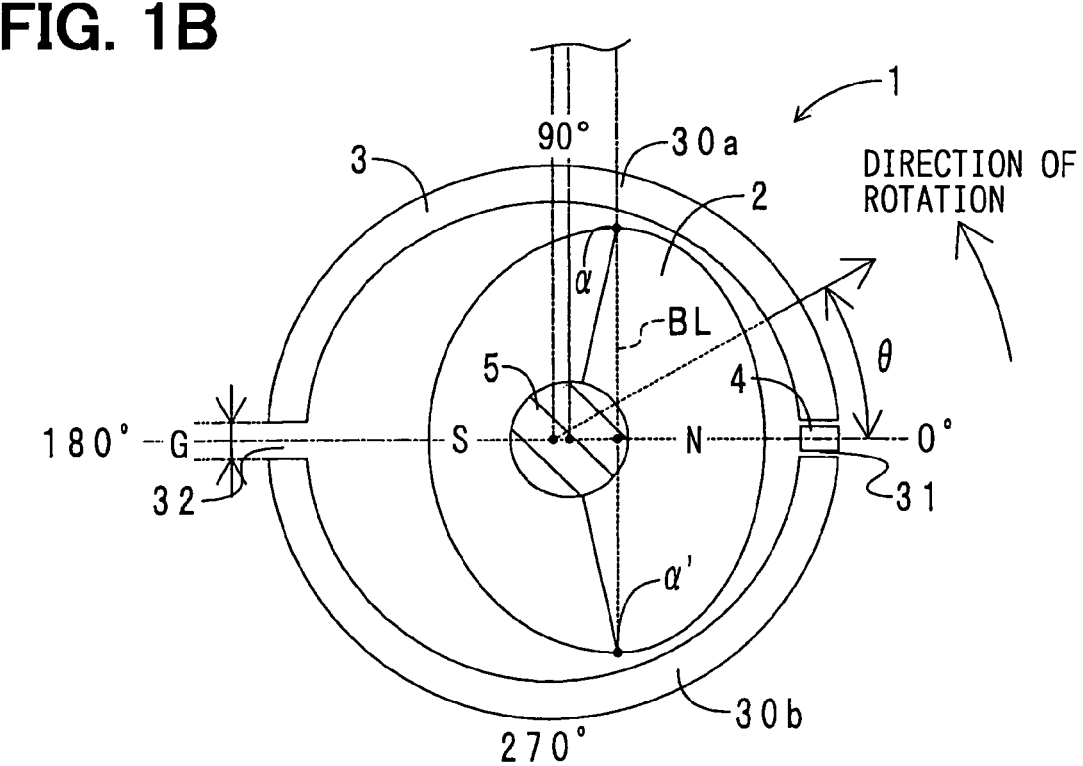
Figure 3:
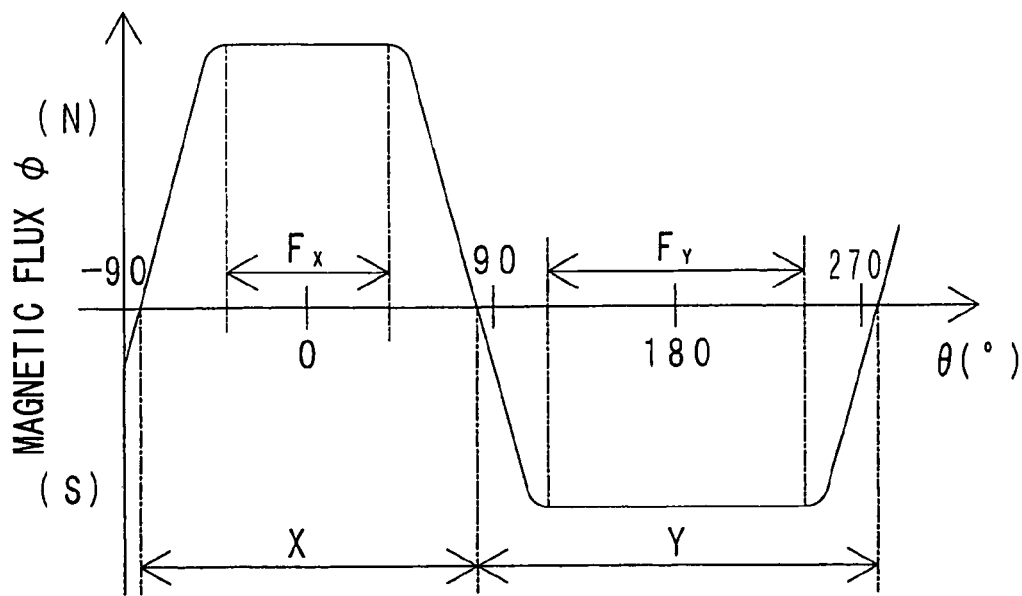
FIG. 3 is a graph showing a characteristic curve of magnetic flux relative to rotation positions.

With the above arrangement of the permanent magnet member 2, the magnetic flux where the hall IC element 4 is positioned, changes as shown in FIG. 3 when the rotary shaft turns back and forth from the position shown in FIG. 1B. As shown in FIG. 3, the magnetic flux does not change in angle ranges Fx and Fy (i.e. flat ranges). The flat range Fx is in the N-pole flux distribution curve, and the flat range Fy is in the S-pole flux distribution curve. It should be noted that the flat range Fx is shorter than the flat range Fy.

Figure 5:
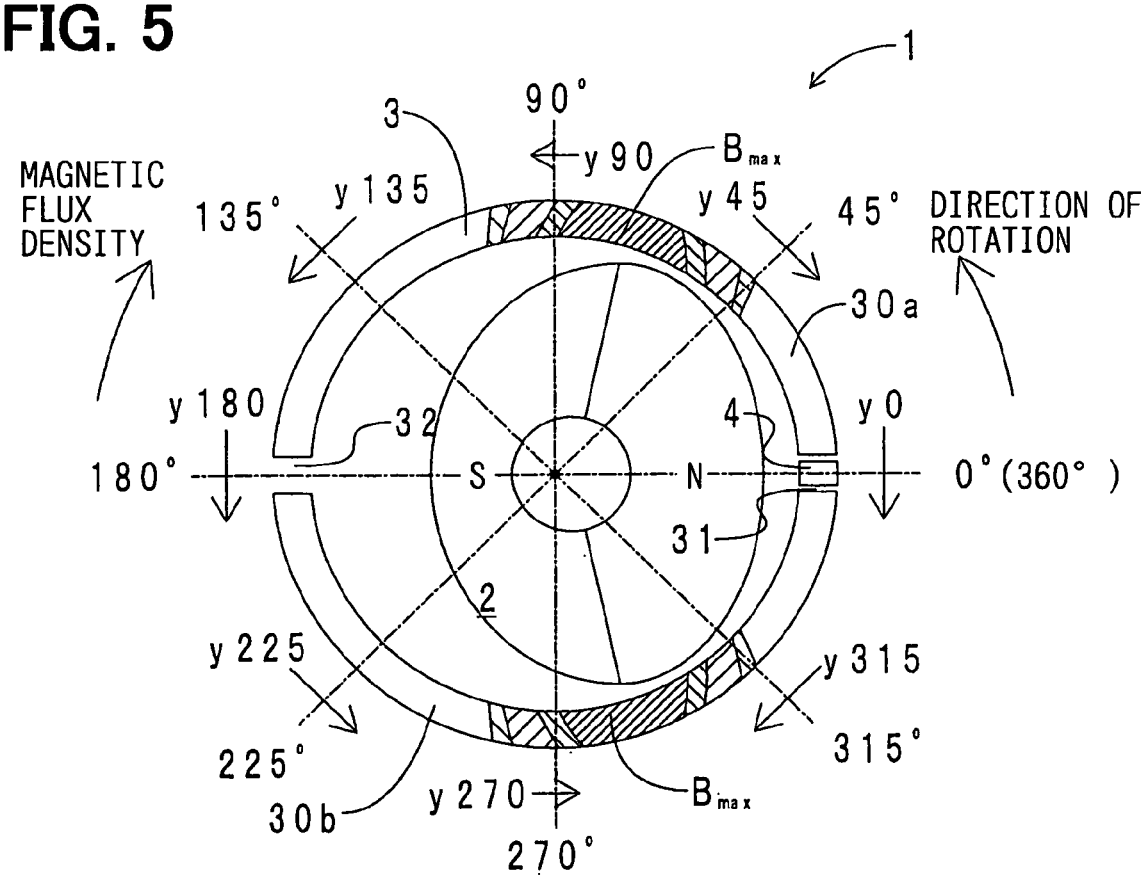
FIG. 5 is a schematic diagram showing a change in magnetic density at various angular positions of the yoke.
Figure 4:
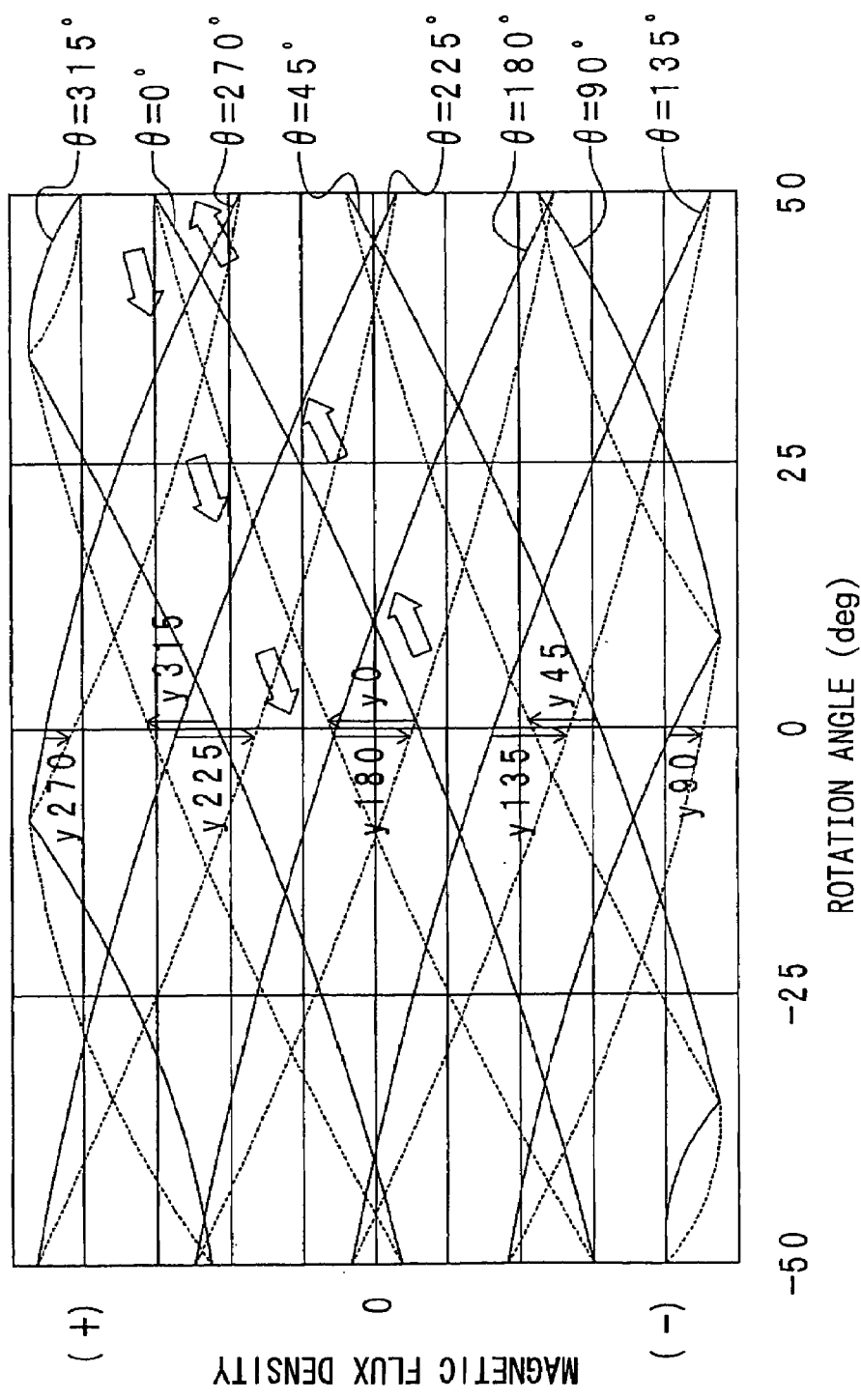
FIG. 4 is a graph showing changes in magnetic flux density in a yoke when the permanent magnet is turned back and forth within an angle range of ±50 degrees.

When the permanent magnet member 2 turns back and forth within ±50 degrees from the position where the hall IC is located, the magnetic flux density in the yoke 3 changes as shown in FIGS. 4 and 5. In FIG. 4, solid lines indicate changes of the magnetic flux density when the permanent magnet member 2 turns in the counter clock direction (positive direction), and dotted lines indicate changes of the magnetic flux density when the permanent magnet member 2 turns in the clock direction (negative direction).

When the permanent magnet member 2 turns in the positive direction and then turns back, the magnetic flux density increases at angular positions, $\theta=0$, $\theta=45°$ and $\theta=315$, as indicated by arrows y0, y45 and y315 in FIG. 4. Thus, the output signal of the hall IC has a hysteresis characteristic. On the other hand the magnetic flux density decreases at angular positions, $\theta=90$, $\theta=135°$ and $\theta=225°$ as indicated by arrows y90, y135 and y225 in FIG. 4.

As shown in FIG. 5, the arrows y45, y0 and y315 point clockwise (magnetic flux density increasing direction), while the arrows y90, y135, y180, y225 and y270 point counter-clockwise (magnetic flux density decreasing direction). Thus, when the permanent magnet member 2 is positioned at angular position 0°, the magnetic core has portions of maximum flux density at its angular range between 45° and 90° and its angular range between 270° and 315°, as shown by hatched portions in FIG. 5, in which a thicker hatched portion indicates a larger magnetic flux density. In other words, the magnetic flux density becomes maximum at portions of the yoke within 90 degrees from the circumferential front gap 31. Accordingly, an increase in the magnetic flux density in the front air gap 31 corresponds to a difference between the increase indicated by arrows y45, y0 and y315 and the decrease indicated by y90 and y270. Thus, the variation in the output signal of the hall IC element 4 due to the hysteresis characteristic is almost canceled or suppressed. As a result, it is not necessary to provide the yoke 3 that is made from an expensive material having a low hysteresis characteristic such as permalloy.

Figure 6A:
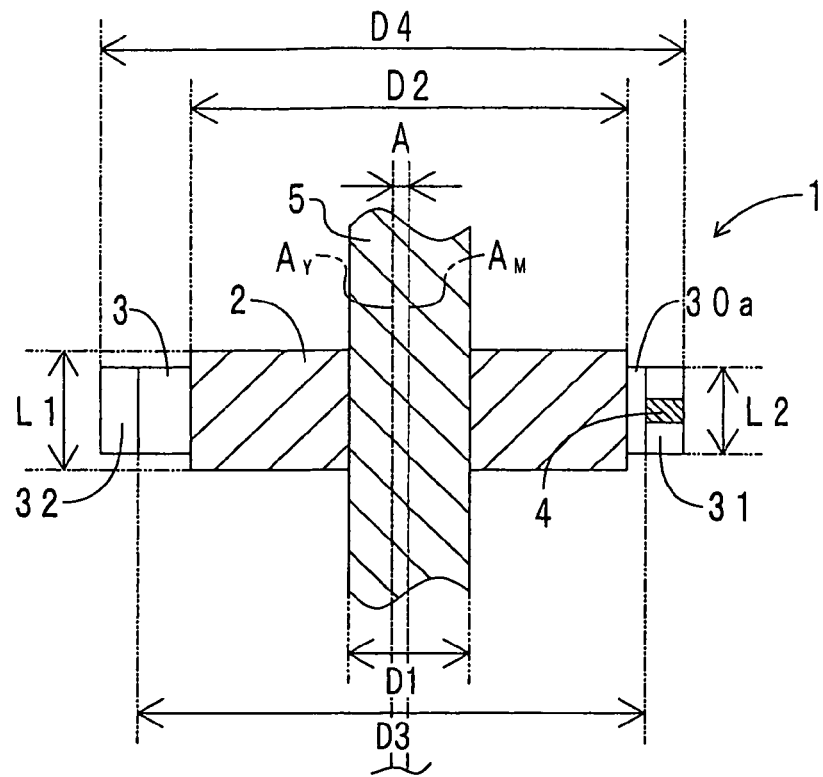
FIGS. 6A and 6B illustrate a rotation angle detecting device according to the second embodiment of the invention.

A rotation angle detecting device 1 according to the second embodiment of the invention will be described with reference to FIGS. 6A, 6B and 6C. Incidentally, the same reference numeral to be used hereafter as that used in the description of the first embodiment corresponds to the same or substantially the same portion or part of the first embodiment.

The rotation angle detecting device 1 according to the second embodiment includes a cylindrical permanent magnet 2, a cylindrical magnetic yoke 3, a hall IC element 4 and a rotary shaft 5. The cylindrical magnetic yoke 3 has a center axis $A_Y$. The permanent magnet 2 has a circular cross-section that has front and rear surfaces at the opposite ends and a center axis $A_M$, to which the rotary shaft 5 is fixed. However, the center axis $A_M$ is shifted by A from the center axis Ay of the yoke 3 toward the front gap 31 where the hall IC element is disposed. The permanent magnet 2 is made of a ferrite magnet material and magnetized to have a magnetic N pole at the front surface and magnetic S pole at the rear surface.

The rotation angle detecting device 1 according to the second embodiment has the following specifications: the rotary shaft 5 has an outside diameter D1 of 4 mm; the permanent magnet 2 has an outside diameter D2 of 10 mm and an axial thickness L1 of 6 mm; the yoke 3 has an inside diameter D3 of 13 mm, an outside diameter D4 of 16 mm and an axial thickness L2 of 5 mm; and each of the gaps 31, 32 has a circumferential width G of 1.5 mm. As shown in FIG. 6C, the hysteresis loop in the front gap 31 becomes minimum when the distance A between the center axis $A_M$ of the permanent magnet member 2 and the center axis $A_Y$ of the magnetic yoke 3 is 0.5 mm.

Figure 6B:
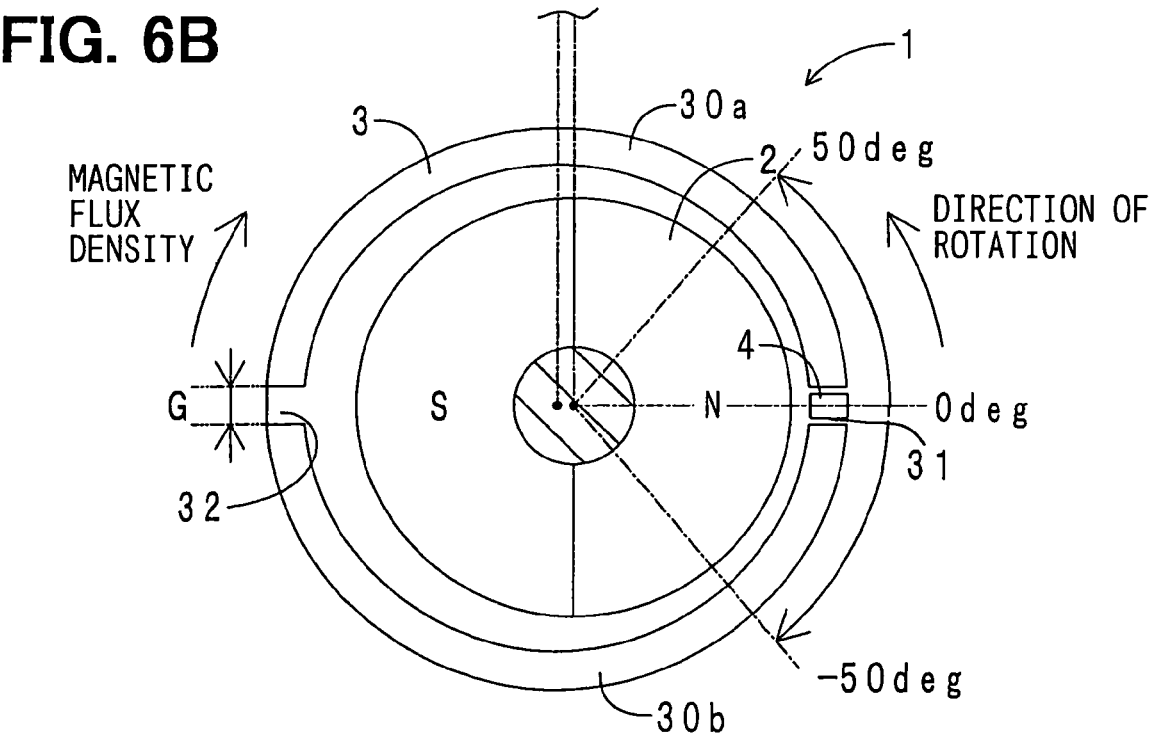
Figure 6C:
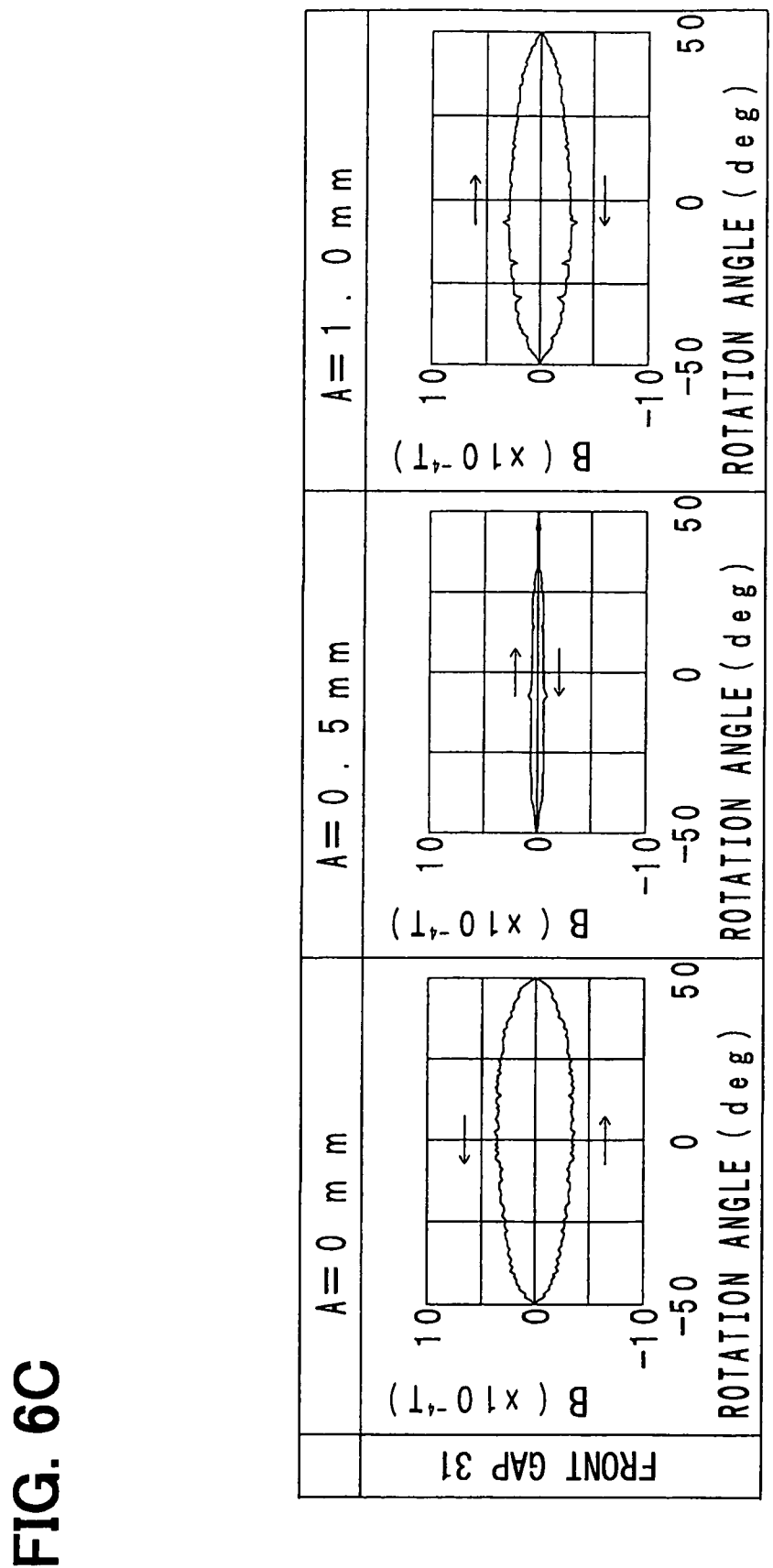
FIG. 6C is a graph showing relations between the rotation angle (degree) of the permanent magnet and the magnetic flux density (B) when the shift distance A between the center of a magnetic yoke and a center of a permanent magnet changes.

With the above arrangement of the permanent magnet member 2, the magnetic flux in the front gap 31, where the hall IC element 4 is positioned, changes in the same manner as shown in FIG. 3 when the rotary shaft turns back and forth from the position shown in FIG. 6B. The magnetic flux distribution curve has flat ranges as shown in FIG. 3.

As a result, it is not necessary to provide the yoke 3 that is made from an expensive material having a low hysteresis characteristic such as permalloy.

Figure 7A:
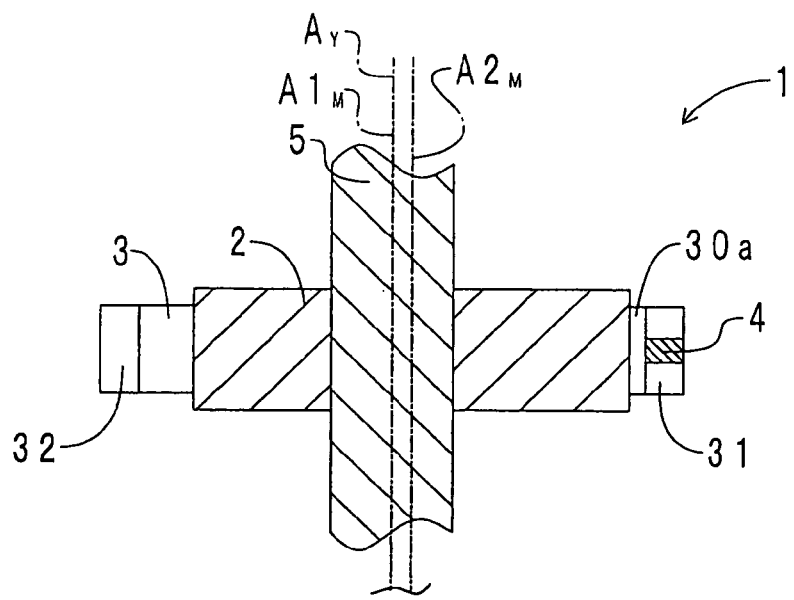
FIGS. 7A and 7B illustrate a rotation angle detecting device according to the third embodiment of the invention.

A rotation angle detecting device 1 according to the third embodiment of the invention will be described with reference to FIGS. 7A and 7B.

The rotation angle detecting device 1 according to the third embodiment includes a cylindrical permanent magnet 2, a cylindrical magnetic yoke 3, a hall IC element 4 and a rotary shaft 5. The cylindrical magnetic yoke 3 has a center axis $A_Y$. The permanent magnet 2 has a circular cross-section that has front and rear surfaces at the opposite ends and a center axis $A2_M$. However, the rotary shaft 5 is fixed to the permanent magnet 2 so that the rotation axis thereof can be located on a portion $A1_M$ that corresponds to the center axis Ay of the yoke, which is shifted from the center axis $A2_M$ of the permanent magnet 2 to recede from the front gap 31 where the hall IC element is disposed.

Figure 7B:
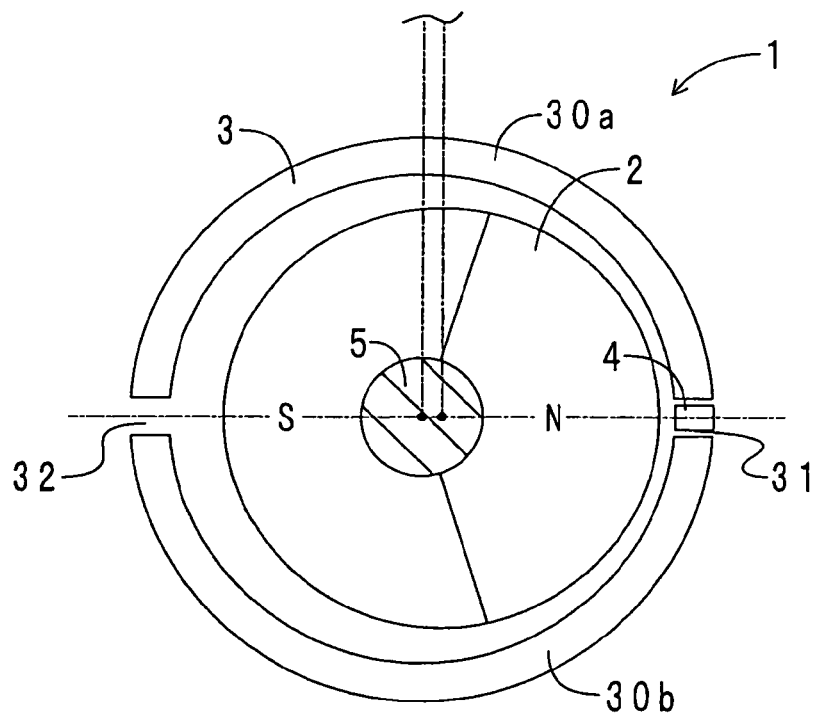

With the above arrangement of the permanent magnet member 2, the magnetic flux in the front gap 31, where the hall IC element 4 is positioned, changes in the same manner as shown in FIG. 3 when the rotary shaft turns back and forth from the position shown in FIG. 7B. As a result, it is not necessary to provide the yoke 3 that is made from an expensive material having a low hysteresis characteristic such as permalloy.

Figure 8A:
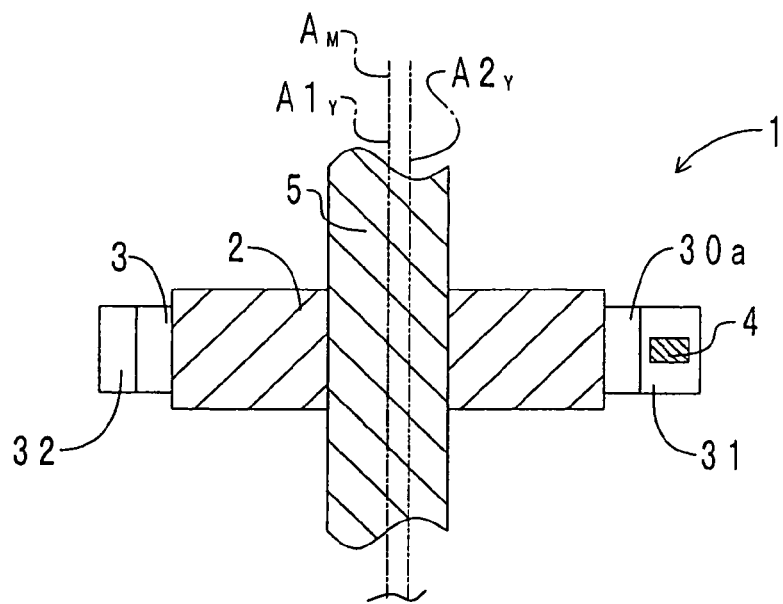
FIGS. 8A and 8B illustrate a rotation angle detecting device according to the fourth embodiment of the invention.

A rotation angle detecting device 1 according to the fourth embodiment of the invention will be described with reference to FIGS. 8A and 8B.

The rotation angle detecting device 1 according to the fourth embodiment includes a cylindrical permanent magnet 2, a cylindrical magnetic yoke 3, a hall IC element 4 and a rotary shaft 5. The cylindrical magnetic yoke 3 has an inner cylindrical surface that has an inner center axis $A1_Y$ and an outer cylindrical surface that has an outer center axis $A2_Y$. The permanent magnet 2 has a circular cross-section that has front and rear surfaces at the opposite ends and a center axis $A_M$. The rotary shaft 5 is fixed to the portion of the permanent magnet 2 that corresponds to the center axis $A1_Y$ of the yoke 3.

Figure 8B:
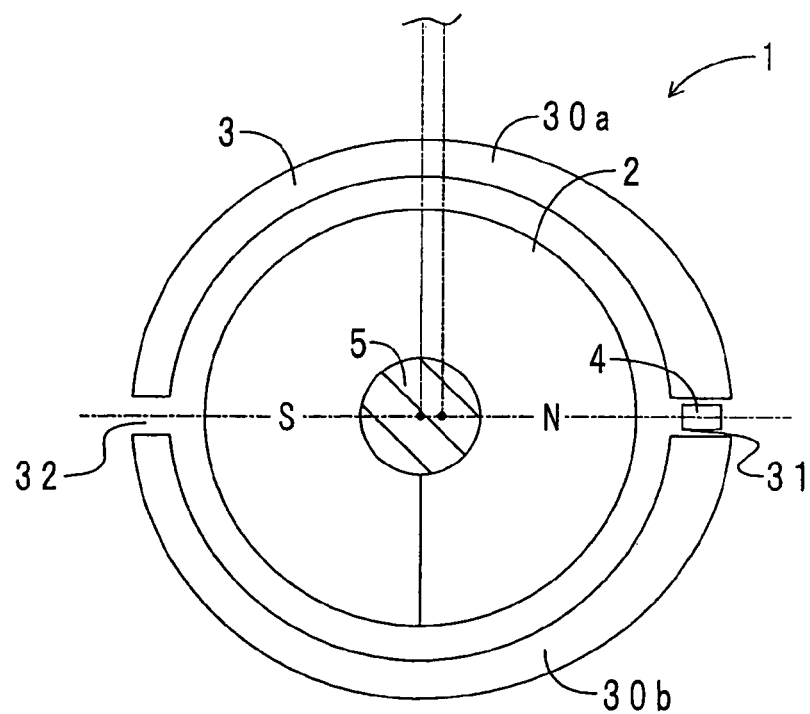

With the above arrangement of the permanent magnet member 2, the magnetic flux in the front gap 31, where the hall IC element 4 is positioned, changes in the same manner as shown in FIG. 3 when the rotary shaft turns back and forth from the position shown in FIG. 8B.

As a result, it is not necessary to provide the yoke 3 that is made from an expensive material having a low hysteresis characteristic such as permalloy.

Figure 9A:
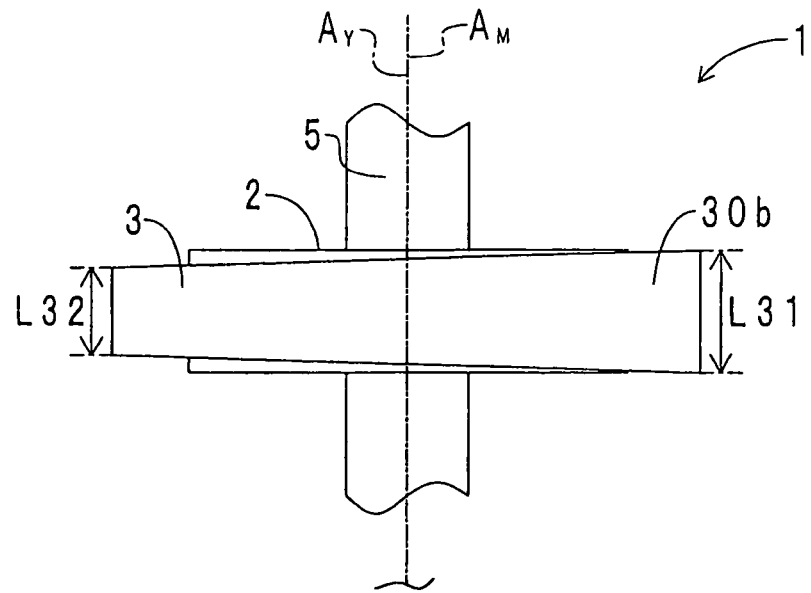
FIGS. 9A and 9B illustrate a rotation angle detecting device according to the fifth embodiment of the invention.

A rotation angle detecting device 1 according to the fifth embodiment of the invention will be described with reference to FIGS. 9A and 9B.

The rotation angle detecting device 1 according to the fifth embodiment includes a cylindrical permanent magnet 2, a cylindrical magnetic yoke 3, a hall IC element 4 and a rotary shaft 5. The cylindrical magnetic yoke 3 has a center axis Ay and a cylindrical portion whose axial thickness gradually increases from the rear gap 32 toward the front gap 31. In other words, the cylindrical yoke 3 has a maximum thickness L31 at the front gap 31 and a minimum thickness L32 at the rear gap 32. The permanent magnet 2 has a circular cross-section that has front and rear surfaces at the opposite ends and a center axis $A_M$, which aligns or agrees with the center axis $A_Y$ of the magnetic yoke 3. The rotary shaft 5 is fixed to the permanent magnet 2 so that the permanent magnet 3 can rotates about the center axis $A_Y$ of the yoke 3.

Figure 9B:
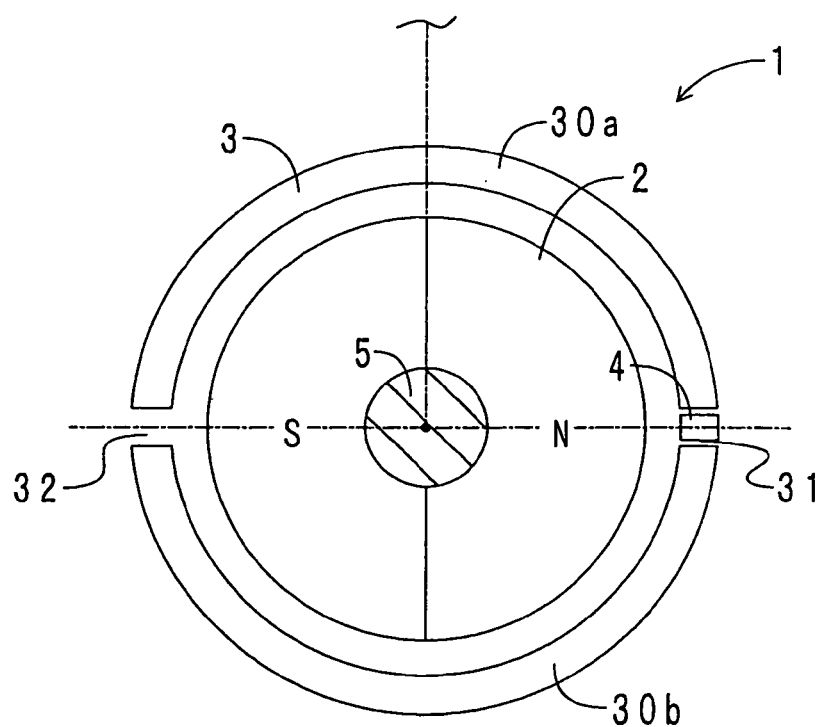

With the above arrangement of the permanent magnet member 2, the magnetic flux in the front gap 31, where the hall IC element 4 is positioned, changes in the same manner as shown in FIG. 3 when the rotary shaft turns back and forth from the position shown in FIG. 9B.

Figure 10A:
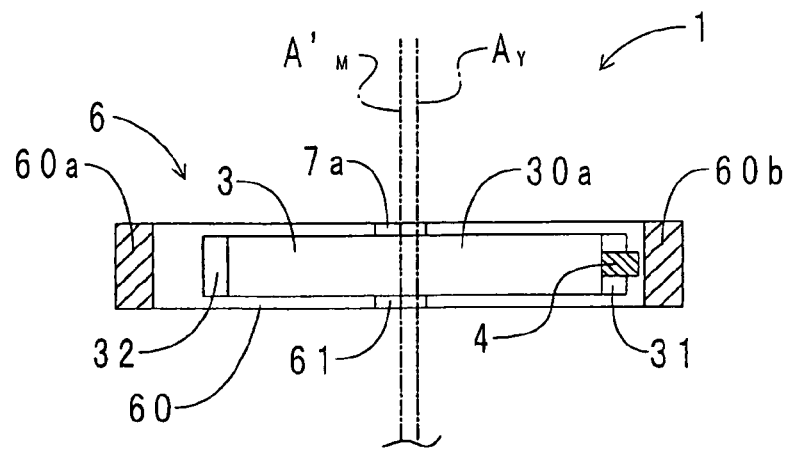
FIGS. 10A and 10B illustrate a rotation angle detecting device according to the sixth embodiment of the invention.

A rotation angle detecting device 1 according to the sixth embodiment of the invention will be described with reference to FIGS. 10A and 10B.

The rotation angle detecting device 1 according to the sixth embodiment includes a cylindrical magnetic flux supply member 6, a cylindrical magnetic yoke 3, a hall IC element 4 and a rotary shaft 5. The cylindrical magnetic yoke 3 has a center axis $A_Y$, but is disposed within the inner surface of the magnetic flux supply member 6. The magnetic flux supply member 6 has a pair of heat-treated semi-circular magnetic members (e.g. DSUS 13A) 60a and 60b and a pair of permanent ferrite magnet pieces 7a and 7b at gaps 61, 62 between the semicircular magnetic members 60a and 60b. The magnetic flux supply member 6 has front and rear surfaces at the opposite ends and a center axis $A_M'$, which is shifted from the the center axis Ay of the magnetic yoke 3 to recede from the front gap 31 where the hall IC element 4 is located. The permanent magnet pieces 7a, 7b are magnetized to have a magnetic N pole at the front surface and magnetic S pole at the rear surface.

Figure 10B:
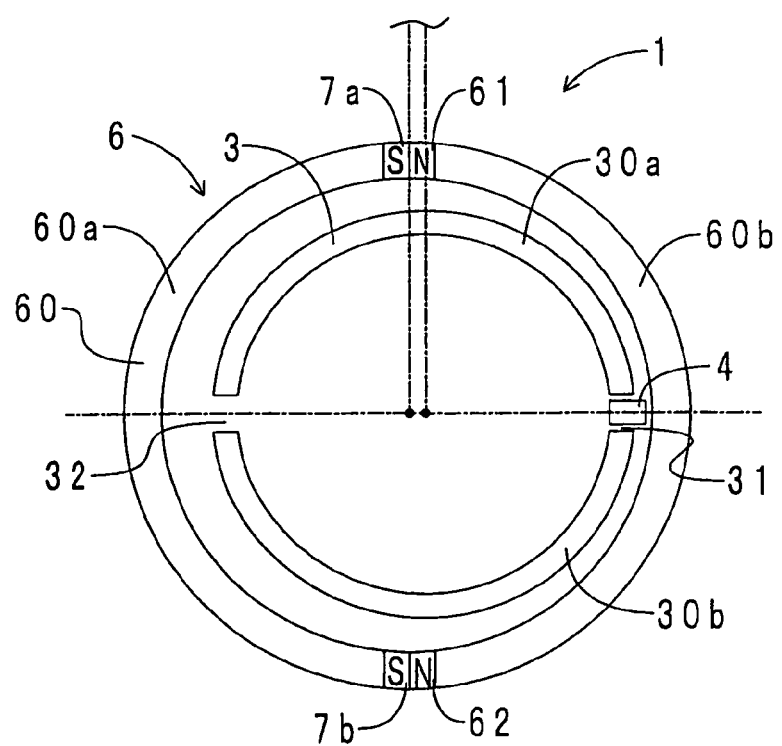

With the above arrangement of the magnetic flux supply member 6, the magnetic flux in the front gap 31, where the hall IC element 4 is positioned, changes in the same manner as shown in FIG. 3 when the rotary shaft turns back and forth from the position shown in FIG. 10B.

Figure 11A:
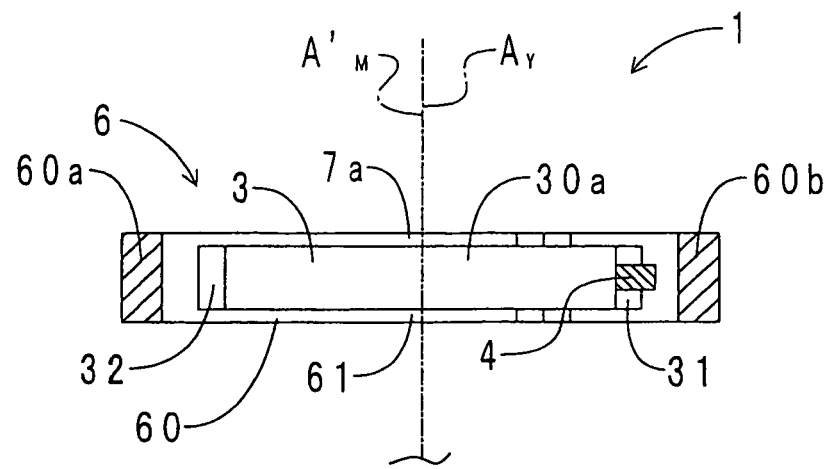
FIGS. 11A and 11B illustrate a rotation angle detecting device according to the seventh embodiment of the invention.
Figure 11B:
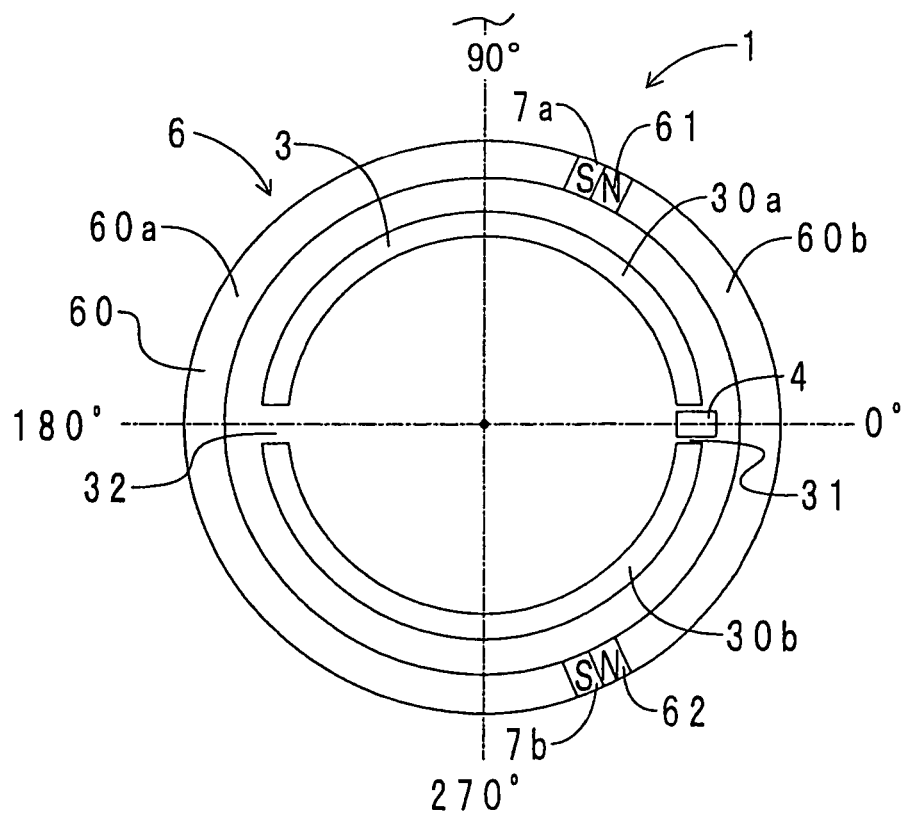
Figure 12:
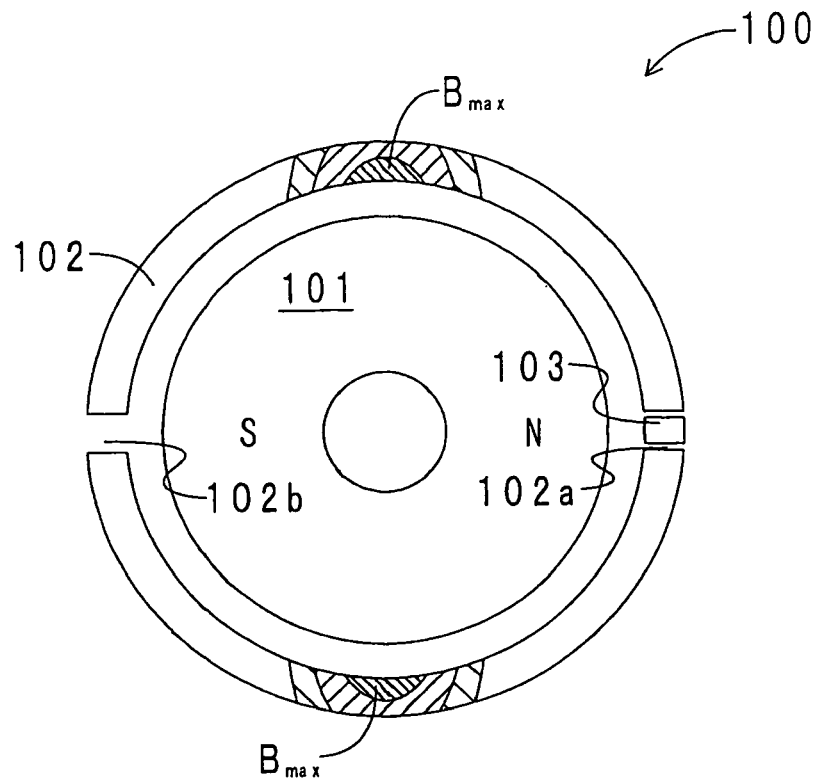
FIG. 12 is a schematic plan view of a prior art rotation angle detecting device.
Figure 13:
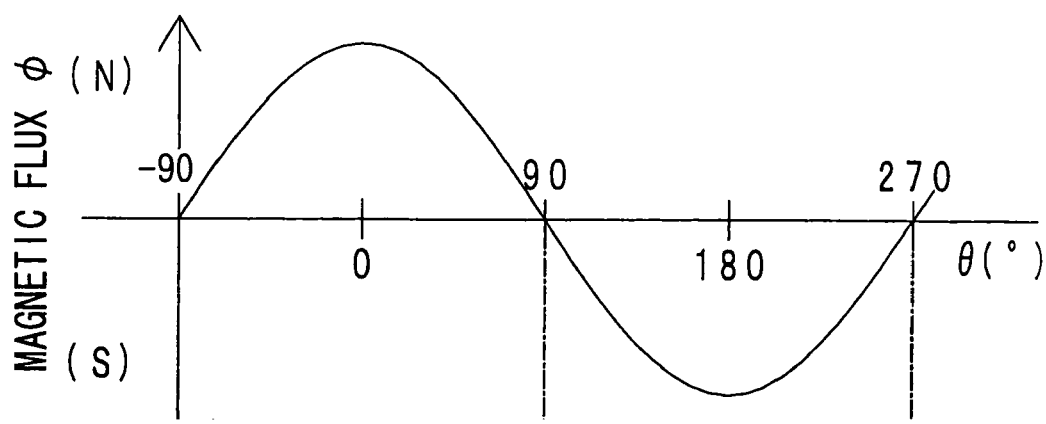
FIG. 13 is a graph showing a characteristic curve of magnetic flux provided relative to rotation positions by the prior art rotation angle detecting device.

A rotation angle detecting device 1 according to the seventh embodiment of the invention will be described with reference to FIGS. 11A and 11B.

The rotation angle detecting device 1 according to the seventh embodiment includes a cylindrical magnetic flux supply member 6, a cylindrical magnetic yoke 3, a hall IC element 4 and a rotary shaft 5. The cylindrical magnetic yoke 3 has a center axis $A_Y$ and is disposed within the inner surface of the magnetic flux supply member 6. The magnetic flux supply member 6 has a longer semicircular magnetic members 60a and a shorter semicircular magnetic member 60b (made of a heat-treated soft iron such as DSUS13A) and a pair of permanent magnet pieces 7a and 7b at gaps 61, 62 between the semicircular magnetic members 60a and 60b so that the permanent magnetic pieces 7a, 7b can be disposed within an angle range less than 90 degrees (or more than 270 degrees) from the front gap 31. The magnetic flux supply member 6 has front and rear surfaces at the opposite ends and a center axis $A_M'$, which is also the center axis Ay of the magnetic yoke 3. The permanent magnet pieces 7a, 7b are made of a ferrite magnet material and magnetized to have a magnetic N pole at the front surface and magnetic S pole at the rear surface.

With the above arrangement of the magnetic flux supply member 6, the magnetic flux in the front gap 31, where the hall IC element 4 is positioned, changes in the same manner as shown in FIG. 3 when the rotary shaft turns back and forth from the position shown in FIG. 10B.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotation angle detecting device comprising:

a columnar permanent magnet having a generally oval cross-section that has a long axis (BL) and a short axis (CL) intersecting right angles at the middle position (O) of the long axis (BL), a front surface magnetized to have one magnetic pole at a front end of the short axis and a rear surface magnetized to have the other magnetic pole at a rear end of the short axis;

a yoke disposed radially outer side of said permanent magnet, said yoke having a generally cylindrical inner surface and a circumferential front gap disposed opposite the front surface of said permanent magnet;

a rotary shaft fixed to said permanent magnet at a position of the short axis offset from the middle position so that said permanent magnet can turn back and forth within the inside surface of said yoke; and a magnetic sensor disposed in the front gap to detect the magnetic flux density therein.

2. The rotation angle detecting device as claimed in claim 1, wherein assuming that the long axis (BL) is X axis of a X-Y coordinate and the short axis (CL) is Y axis thereof, the peripheral line of the front surface of said permanent magnet has a front curve that is expressed as follows: $X^2/b^2+Y^2/a^2=1$, in which a is a distance between the middle point O and an intersection of the short axis (CL) and the front curve, b is a distance between the middle point O and an intersection of the long axis (BL) and the front curve.

3. The rotation angle detecting device as claimed in claim 2, wherein the peripheral line of the rear surface of said permanent magnet has a rear curve whose radius R of curvature is expressed as follows:

$$R=b+(a'-b)\times(\theta_b/90)^2, \ (0°\leq\theta_b\leq 90°)$$

$$R=b+(a'-b)\times((180-\theta_b)/90)^2, \ (90°\leq\theta_b\leq 180°)$$

in which a' is a distance between the middle point O and an intersection of the short axis (CL) and the rear curve, $\theta_b$ is an angle of a point on the rear curve angled from the long axis (BL).

* * * * *